(12) United States Patent
Reuter

(10) Patent No.: US 12,584,777 B2
(45) Date of Patent: Mar. 24, 2026

(54) METHOD AND APPARATUS FOR CONTINUOUSLY SUPPLYING A METERING DEVICE

(71) Applicant: MARCO Systemanalyse und Entwicklung GmbH, Dachau (DE)

(72) Inventor: Martin Reuter, Dachau (DE)

(73) Assignee: MARCO Systemanalyse und Entwicklung GmbH, Dachau (DE)

( * ) Notice: Subject to any disclaimer, the term of this patent is extended or adjusted under 35 U.S.C. 154(b) by 232 days.

(21) Appl. No.: 18/335,486

(22) Filed: Jun. 15, 2023

(65) Prior Publication Data

US 2023/0408317 A1　　Dec. 21, 2023

(30) Foreign Application Priority Data

Jun. 17, 2022　　(DE) ......................... 102022115177.8

(51) Int. Cl.

| | |
|---|---|
| *G01F 15/18* | (2006.01) |
| *B01F 25/00* | (2022.01) |
| *B29B 7/32* | (2006.01) |
| *B29B 7/60* | (2006.01) |
| *B29B 7/72* | (2006.01) |
| *G01F 3/18* | (2006.01) |
| *G01F 13/00* | (2006.01) |
| *G01F 15/02* | (2006.01) |
| *G01F 15/07* | (2006.01) |
| *G01F 23/64* | (2006.01) |
| *G05D 11/13* | (2006.01) |
| *G01F 15/00* | (2006.01) |
| *G01F 15/075* | (2006.01) |

(52) U.S. Cl.
CPC ............ *G01F 13/006* (2013.01); *B01F 25/14* (2022.01); *B29B 7/32* (2013.01); *B29B 7/603* (2013.01); *B29B 7/72* (2013.01); *G01F 13/008*

(2013.01); *G01F 15/02* (2013.01); *G01F 15/07* (2013.01); *G01F 15/185* (2013.01); *G01F 3/18* (2013.01); *G01F 15/003* (2013.01); *G01F 15/005* (2013.01); *G01F 15/0755* (2013.01); *G01F 23/64* (2013.01); *G05D 11/139* (2013.01)

(58) Field of Classification Search
CPC .... G01F 13/006; G01F 13/008; G01F 15/003; G01F 15/005; G01F 15/07; G01F 15/0755; G01F 15/02; G01F 15/185; G01F 3/18; G01F 23/64; B01F 25/14; B29B 7/32; B29B 7/603; B29B 7/72; Y10T 137/469
USPC ........................................................ 137/256
See application file for complete search history.

(56) References Cited

U.S. PATENT DOCUMENTS

| | | | | | |
|---|---|---|---|---|---|
| 940,402 | A | * | 11/1909 | Patterson | ................. B01J 4/001 137/208 |
| 3,285,272 | A | * | 11/1966 | Messenger | ............. B64D 37/00 137/563 |

(Continued)

FOREIGN PATENT DOCUMENTS

| | | |
|---|---|---|
| DE | 3803419 C2 | 5/1993 |
| DE | 19845702 C2 | 6/2002 |
| DE | 102016215987 A1 | 3/2018 |

*Primary Examiner* — William M McCalister
(74) *Attorney, Agent, or Firm* — Vivacqua Crane, PLLC

(57) ABSTRACT

In a method for continuously supplying a metering device with different batches of one and the same liquid medium, a progressive addition of the medium of a new batch takes place during a batch change.

9 Claims, 2 Drawing Sheets

(56)                    References Cited

U.S. PATENT DOCUMENTS

| | | | | |
|---|---|---|---|---|
| 3,617,029 | A * | 11/1971 | Breer | B29B 7/603 366/181.8 |
| 5,502,685 | A * | 3/1996 | Orlando | A01M 7/0092 366/132 |
| 6,874,929 | B2 * | 4/2005 | Hiraoka | B01F 33/80 137/391 |
| 6,962,627 | B2 * | 11/2005 | Sekiguchi | B05C 11/1002 222/64 |
| 12,310,378 | B2 * | 5/2025 | Stokes | B05B 12/1418 |

* cited by examiner

METHOD AND APPARATUS FOR CONTINUOUSLY SUPPLYING A METERING DEVICE

CROSS-REFERENCE TO RELATED APPLICATIONS

This application claims the benefit of foreign priority under 35 U.S.C. § 119 of German patent application number 102022115177.8, filed on Jun. 17, 2022. The contents of this application are incorporated herein by reference in their entirety.

INTRODUCTION

The present invention relates to a method and an apparatus for continuously supplying a metering device with different batches of one and the same liquid medium.

In industrial production, there is often the problem that different batches of liquids, for example of adhesives or of casting materials, differ significantly with respect to their properties. However, a compensation can take place through changes of metering parameters, such as the opening time of a metering valve, media pressure, or also temperature, in order to achieve the same metering result even with changed media parameters, for example with a changing viscosity. If the result is controlled during the metering, minor and slowly occurring changes can be compensated by adapting metering parameters. However, the problem occurs here that the properties of the medium to be metered can change so much during a batch change that a readjustment of metering parameters is not sufficient to achieve consistent metering results.

To solve this problem, the possibility exists to either clean or replace all the components guiding the medium during a batch change. In this case, the metering system, however, has to be readjusted to the properties of the subsequent batch. If, on the other hand, a batch change takes place without cleaning, an abrupt change in the media properties nevertheless occurs, during which change an automatic readjustment of the metering parameters is not possible.

It is therefore the object of the present invention to provide a method and an apparatus for continuously supplying a metering device, by which method and apparatus a metering device can be continuously supplied with different batches without a cleaning or a replacement of components being required or a complete readjustment of the metering parameters having to take place. This object is satisfied by the features of the independent claims.

SUMMARY

To satisfy the object, in accordance with a first aspect, a method for continuously supplying a metering device with different batches of one and the same liquid medium is provided, in which method a new batch is supplied to the metering device after the metering of a first batch. In this respect, the medium of the new batch is progressively added to the medium of the first batch with the aid of a control during such a batch change. Due to a progressive addition, i.e. a gradually increasing addition, of the medium of the new batch to the medium of the old batch, it can be achieved that the transition between the two batches is smoothed and a control of the metering device can perform a continuous adaptation to the properties of the two media by adapting metering parameters. The regulation of the metering device can hereby compensate the only minor changes in the parameters of the added medium, whereby an interruption-free production is possible. Since the addition of the new batch is controlled by a control, the transition between the two media can be controlled as desired and in particular such that no abrupt but only minor changes in the material parameters of the medium supplied to the metering device take place.

Advantageous embodiments of the invention are described in the description, in the drawing, and in the dependent claims.

In accordance with a first advantageous embodiment, the medium of the first and the new batch can be mixed in a line before it is supplied to the metering device. Due to such a common supply line, into which the medium of the old batch and the medium of the new batch are added in a specific mixing ratio, a mixing can take place within the line without additional mixing components, for example static mixers or the like, being necessary for this purpose.

In accordance with a further advantageous embodiment, the volume of the medium added per unit of time can be predefined by the control. Thus, it can be predefined in the control that, for example, the medium of the new batch is first added to the medium of the old batch only in small quantities and in increasing quantities as the time increases, whereby only minor changes in the medium added to the metering device result after the mixing of the two media.

In accordance with a further advantageous embodiment, the medium of the first batch can be supplied from a first container and the medium of the second batch can be supplied from a second container, wherein the medium in the second container is conditioned while the metering device is supplied with medium from the first container. The advantage hereby results that, when maintaining a continuous operation, a preconditioning of the new batch is possible, for example, a mixing, a temperature control, and/or a degassing.

In accordance with a further advantageous embodiment, a metering device can be used with which an automatic adaptation of metering parameters takes place in the event of a change in the viscosity of the medium to be metered. In this case, a constant metering result can also be achieved with then only minor changes in the material properties of the medium to be metered without having to interrupt the operation for this purpose.

In accordance with a further advantageous embodiment, an apparatus for carrying out a method of the kind described above can be provided that has a first and a second container and a first and a second pump, wherein, with the pumps, medium can be supplied to a metering device via a common line. Furthermore, a control can be provided that is configured and adapted to control the two pumps such that medium from the second container is progressively added to the medium from the first container. The quantity supplied by each pump into the common line can be predefined and set by suitably controlling the two pumps, wherein the ratio of the volumes supplied by the two pumps into the common line per unit of time can in particular also be predefined.

If, for example, piston pumps are used, the number of piston strokes per unit of time and/or the length of the respective piston stroke can be predefined with the aid of the control. For a progressive admixing of the medium of the new batch to the medium of the old batch, one pump can, for example, first perform nine pump strokes, while the other pump performs one pump stroke per unit of time. This ratio can then be progressively changed over a predetermined period of time so that at the end of the transition phase only the pump of the new batch is in operation, while the pump of the old batch is switched off. The mixing of the two media of the old and the new batch can in this respect take place in an advantageous manner in a common line whose input is connected to the two pumps and whose output is connected to the metering device.

In accordance with a further advantageous embodiment, both containers can be provided with a filling level sensor, wherein the control performs a control of the two pumps in dependence on signals of the filling level sensors. In this embodiment, a continuous operation can be performed in an automated manner since it can be determined with the aid of the filling level sensors when the medium of a batch in a container is running low. The pump supplying the medium of the new batch can then be activated to ensure the smooth transition between the two batches by a progressive admixing.

BRIEF DESCRIPTION OF THE DRAWINGS

The present invention will be described in the following purely by way of example with reference to an advantageous embodiment and to the enclosed drawings. There are shown.

DETAILED DESCRIPTION

Figure 1:
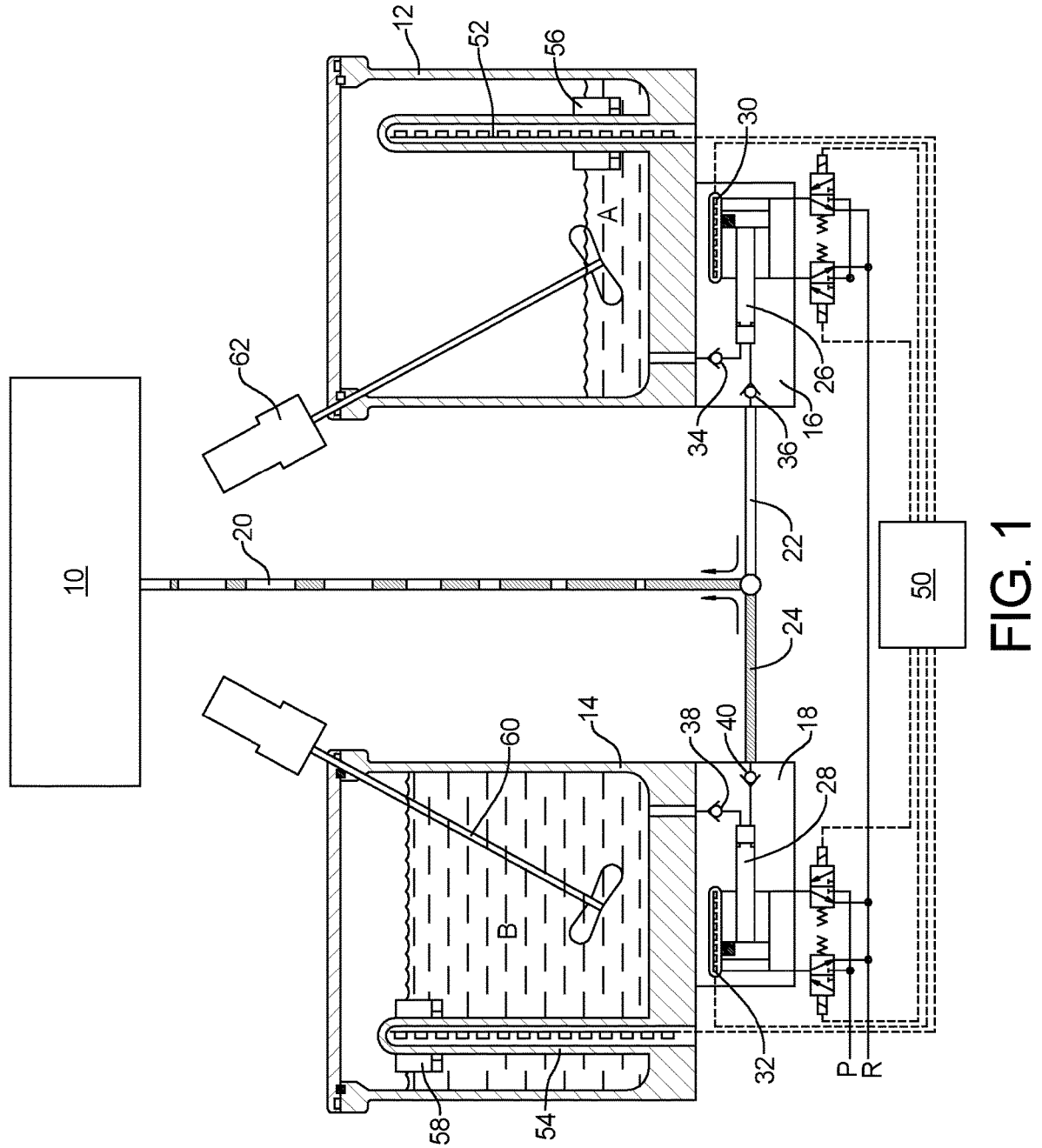
FIG. 1: a schematic representation of an apparatus for a continuous media supply.

FIG. 1 shows an apparatus for continuously supplying a metering device 10 with different batches A and B of one and the same liquid medium. The metering device 10 is only shown schematically and comprises at least one metering valve, for example a jet valve, with which the medium can be applied in very small quantities. Furthermore, the metering device has a regulation known per se with which small changes in material properties of the medium to be metered can be compensated by adapting metering parameters, such as the opening time of the metering valve, media pressure, or temperature, in order to achieve consistent metering results.

The apparatus shown in FIG. 1 furthermore has two substantially identical containers 12 and 14, wherein the medium of a first batch A is filled into the container 12 and the medium of a second batch B is filled into the container 14. However, both media are the same liquid medium, for example an adhesive or a casting material, that can, however, have different material parameters due to the different batches. To supply the medium, the container 12 is in communication with a pump 16 and the container 14 is in communication with a pump 18. By means of the two pumps 16 and 18, the medium present in the container can in each case be pumped from the containers 12 and 14 into a common line 20 that is connected to the two pumps 16 and 18 via supply lines 22 and 24. The contents of the two containers 12 and 14 can thus be supplied to the metering device 10 via the common line 20.

In the embodiment shown, the two pumps 16 and 18 are designed as piston pumps and have a magnetically marked piston 26 and 28, respectively, whose position can be read out via a magnetic measurement system, for example, Hall elements 30, 32. Two check valves 34 and 36 in the region of the pump 16 and two check valves 38 and 40 in the region of the pump 18 serve to alternately supply medium from the container 12 or the container 14 into the common line 20.

In the embodiment shown, a control of the two piston pumps 16 and 18 takes place by a respective two pneumatic valves that are connected to a pressure supply P and a pressure return means R in a known manner.

Furthermore, in the embodiment shown, a control 50 is provided that serves to control the two pumps 16 and 18 such that medium from the one container can be progressively added to the medium from the other container.

Figure 2:
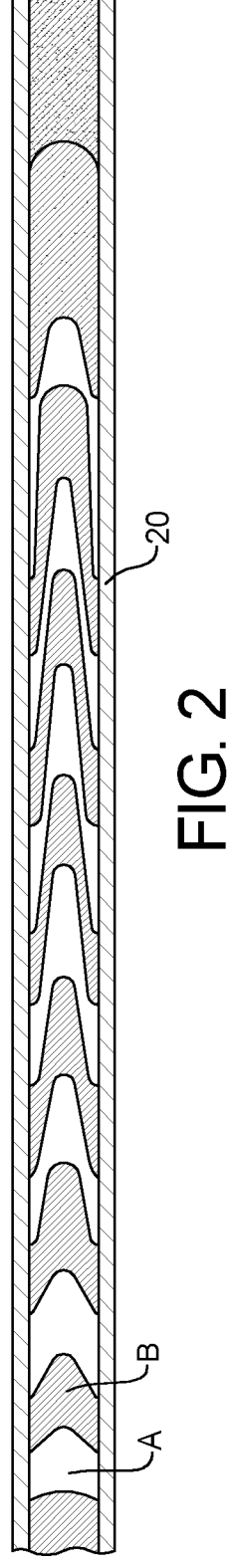
FIG. 2: a longitudinal section through a line.

To automatically recognize such a batch change, both containers 12 and 14 are each provided with a filling level sensor 52 and 54 that detects the respective filling level in the containers 12 and 14 by means of a float 56 and 58. If, for example in the container 12, the medium of the batch A located therein has reached a residual quantity, as shown in FIG. 1, a small stroke of the pump 18 can be triggered after a full stroke of the pump 16 so that only a small quantity of the new batch B is added through the supply line 24 into the common line 20. The control 50 is in this respect programmed such that the volume that is conveyed from the container 12 is continuously reduced, while the volume that is conveyed from the tank 14 is continuously increased. A gradual progressive transition between the media of the two batches A and B hereby takes place. A uniform mixing of the two media in this respect takes place in an advantageous manner within the common line 20 through which the medium of the two batches is supplied to the metering device 10. Due to the laminar flow within the line 20, a mixing of the two batches takes place, which is illustrated in FIG. 2. It shows how, in the line 20, two consecutive media are distributed by the flow front and are mixed.

Figure 3:
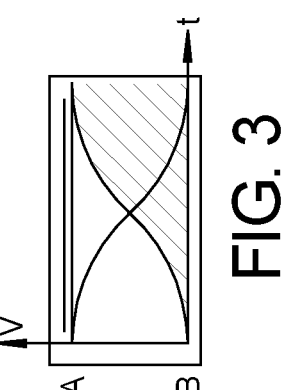
FIG. 3: a diagram that illustrates the supplied volumes during a batch change.

FIG. 3 illustrates the volume reduction of the medium of the batch A supplied from the container 12 and the simultaneous volume increase of the medium B supplied from the container 14. As can be seen, the volume of the batch A supplied per unit of time to the metering device 10 or to the line 20 is reduced, while the volume of the batch B supplied per unit of time is increased until only the medium of the batch B is supplied.

Finally, FIG. 1 shows that both containers 12 and 14 can each be provided with a stirring unit 60, 62 to condition the medium in one container while medium from the other container is supplied to the metering device 10. In addition, the containers can be provided with a temperature control device and/or a degassing device.

It is understood that the embodiment described above is of a purely exemplary nature. For example, the pumps 16 and 18 can also be replaced by any other pumps. A regulation of the media quantity supplied can in any case be achieved by predefining the pumping volume to be conveyed by a pump per unit of time.

The invention claimed is:

1. A method for continuously supplying a metering device with different batches of one and the same liquid medium, in which method a new batch is supplied to the metering device after the metering of a first batch, wherein a medium of the new batch is progressively added to a medium of the first batch with the aid of a control during such a batch change, wherein the medium of the new batch is progressively added to the medium of the first batch by gradually increasing a volume of the medium of the new batch supplied to the metering device while simultaneously gradually reducing a volume of the medium of the first batch supplied to the metering device.

2. The method in accordance with claim 1, wherein the medium of the first batch and the medium of the new batch is mixed in a line.

3. The method in accordance with claim 1, wherein a volume of the medium of the new batch added per unit of time is predefined by the control.

4. The method in accordance with claim 1, wherein the medium of the first batch is supplied from a first container and the medium of the new batch is supplied from a second container, and wherein the medium of the new batch in the second container is conditioned while the metering device is supplied with the medium of the first batch from the first container.

5. The method in accordance with claim 4, wherein the medium of the new batch in the second container is degassed.

6. The method in accordance with claim 1, wherein the metering device adjusts metering parameters in the event of a change in a viscosity of a medium to be metered.

7. An apparatus for carrying out a method for continuously supplying a metering device with different batches of one and the same liquid medium, in which method a new batch is supplied to the metering device after the metering of a first batch, wherein a medium of the new batch is progressively added to a medium of the first batch with the aid of a control during such a batch change, the apparatus having a first and a second container and a first and a second pump, with which pumps medium can be supplied to the metering device via a common line, and having the control that is configured and adapted to control the two pumps such that a medium from the second container is progressively added to a medium from the first container, wherein the medium of the new batch is progressively added to the medium of the first batch by gradually increasing a volume of the medium of the new batch supplied to the metering device while simultaneously gradually reducing a volume of the medium of the first batch supplied to the metering device.

8. The apparatus in accordance with claim 7, wherein both containers are provided with a filling level sensor, and wherein the control performs a control of the two pumps in dependence on signals of the filling level sensors.

9. The apparatus in accordance with claim 7, wherein both containers are provided with a stirring unit and/or a temperature control device.

* * * * *